United States Patent
Yamamoto et al.

(10) Patent No.: US 10,042,582 B2
(45) Date of Patent: Aug. 7, 2018

(54) DATA ERASING METHOD

(71) Applicant: Panasonic Intellectual Property Management Co., Ltd., Osaka (JP)

(72) Inventors: Takeharu Yamamoto, Osaka (JP); Yoshihisa Takahashi, Osaka (JP); Toshiaki Takasu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 15/248,577

(22) Filed: Aug. 26, 2016

(65) Prior Publication Data
US 2017/0060474 A1 Mar. 2, 2017

(30) Foreign Application Priority Data

Aug. 28, 2015 (JP) ................................ 2015-168589
Jun. 21, 2016 (JP) ................................ 2016-122291

(51) Int. Cl.
*G06F 12/02* (2006.01)
*G06F 3/06* (2006.01)
(52) U.S. Cl.
CPC .......... *G06F 3/0652* (2013.01); *G06F 3/0619* (2013.01); *G06F 3/0677* (2013.01); *G06F 3/0689* (2013.01)
(58) Field of Classification Search
None
See application file for complete search history.

(56) References Cited

U.S. PATENT DOCUMENTS

| 5,034,914 | A | * | 7/1991 | Osterlund | ............. G06F 3/0601 360/48 |
| 5,864,655 | A | * | 1/1999 | Dewey | ................ G06F 11/1076 714/42 |
| 5,900,010 | A | * | 5/1999 | Aoki | ................ G11B 11/10595 369/30.34 |
| 2002/0114239 | A1 | | 8/2002 | Yokokawa | |
| 2005/0013217 | A1 | | 1/2005 | Kuroda | |
| 2005/0094521 | A1 | | 5/2005 | Yokokawa | |
| 2005/0094522 | A1 | | 5/2005 | Yokokawa | |
| 2005/0207262 | A1 | | 9/2005 | Terada et al. | |

(Continued)

FOREIGN PATENT DOCUMENTS

JP 2002-245635 A 8/2002
JP 2004-111007 A 4/2004
(Continued)

*Primary Examiner* — Charles Rones
*Assistant Examiner* — Ryan Dare
(74) *Attorney, Agent, or Firm* — McDermott Will & Emery LLP

(57) ABSTRACT

A data erasing method of the present disclosure is a data erasing method for erasing data stripe-recorded in a plurality of write-once optical discs constituting a redundant arrays of inexpensive disks (RAID) system and each including a plurality of data recording blocks and a redundant data block. In the data erasing method, alternate recording of at least one target block and the redundant data block is performed in a predetermined alternate area. The target block is one of the data recording blocks in which target data as erase target data is recorded. The target block is overwritten such that the target data is not correctly read.

12 Claims, 10 Drawing Sheets

(56) References Cited

U.S. PATENT DOCUMENTS

| | | |
|---|---|---|
| 2008/0273448 A1 | 11/2008 | Nakamura |
| 2008/0304377 A1 | 12/2008 | Nakamura |
| 2010/0214900 A1* | 8/2010 | Yang .................... G11B 7/0055 369/83 |
| 2011/0110214 A1 | 5/2011 | Takahashi et al. |
| 2011/0188369 A1 | 8/2011 | Takahashi et al. |
| 2013/0166945 A1 | 6/2013 | Nakao et al. |
| 2014/0075116 A1* | 3/2014 | Takahashi ............. G06F 3/0619 711/114 |
| 2014/0198629 A1 | 7/2014 | Takagi et al. |
| 2017/0060885 A1* | 3/2017 | Gangadharaiah . G06F 17/30085 |

FOREIGN PATENT DOCUMENTS

| | | |
|---|---|---|
| JP | 2004-185656 A | 7/2004 |
| JP | 2004-280991 A | 10/2004 |
| JP | 2005-038490 A | 2/2005 |
| JP | 2007-184053 A | 7/2007 |
| JP | 2004-280865 A | 11/2008 |
| JP | 2010-218665 A | 9/2010 |
| JP | 2011-154777 A | 8/2011 |
| WO | 2005/124768 A1 | 12/2005 |
| WO | 2005/124772 A1 | 12/2005 |
| WO | 2012/105260 A1 | 8/2012 |
| WO | 2013/005418 A1 | 1/2013 |

\* cited by examiner

FIG. 3

| File name | Recording address |
|---|---|
| File 1 | A1~A4 |
| File 2 | A5~A9 |

FIG. 8C

| Alternate source address | Alternate destination address |
|---|---|
| D31 | D3S1 |

FIG. 8D

| Alternate source address | Alternate destination address |
|---|---|
| D41 | D4S0 |

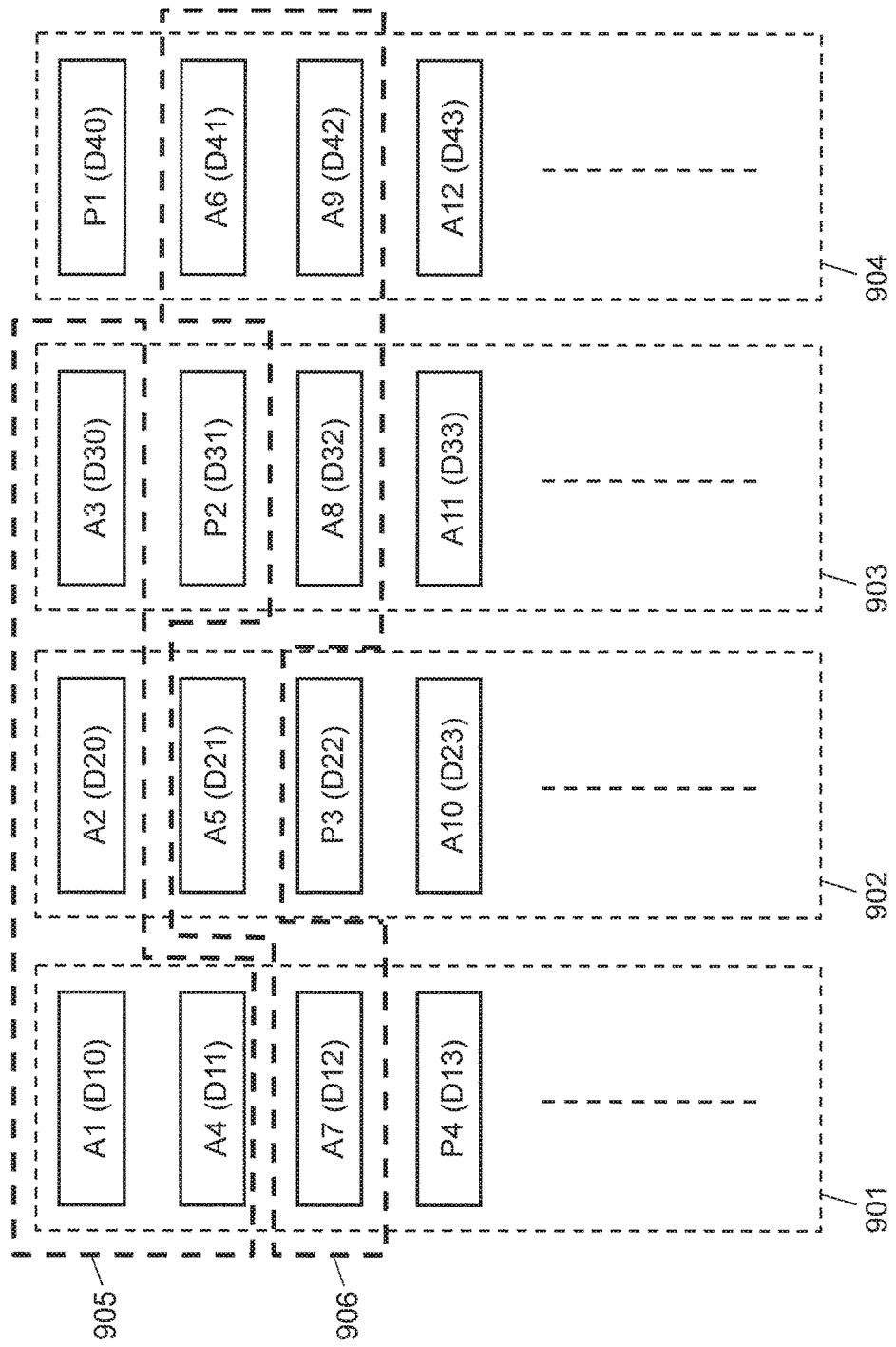

DATA ERASING METHOD

RELATED APPLICATIONS

This application claims the benefit of Japanese Application No. 2015-168589, filed on Aug. 28, 2015, and Japanese Application No. 2016-122291, filed Jun. 21, 2016, the disclosures of which sare incorporated by reference herein.

BACKGROUND

1. Technical Field

The present disclosure relates to a method for erasing data recorded in a redundant arrays of inexpensive disks (RAID) system in which a plurality of write-once optical discs are used.

2. Description of Related Art

A write-once optical disc such as a DVD-R and a BD-R is a recording medium in which a recording mark recorded once cannot be rewritten. Unexamined Japanese Patent Publication No. 2002-245635 discloses an optical disc data erasing device that erases data recorded in the write-once optical disc.

The optical disc data erasing device of Unexamined Japanese Patent Publication. No. 2002-245635 overwrites the recorded data by irradiating the recorded data with a laser beam having recording power during the recording, which allows the recorded data to be erased. Therefore, the erased point becomes unreadable.

On the other hand, because the optical disc is an exchangeable recording medium, a defect can exist on a recording surface due to dust or a flaw. For this reason, in an optical disc drive that performs recording and reproduction on the optical disc, generally, defect management is performed in order to ensure reliability of the recorded or reproduced data (for example, see Unexamined Japanese Patent Publication No. 2011-154777).

Additionally, the RAID system can be configured by using a plurality of optical discs in order to improve the reliability. In a recording device of International Patent Publication No. 2013/005418, a plurality of recording mediums are accommodated in a magazine, the recording medium in the magazine is carried to a plurality of drive units in the recording device, and a RAID controller that performs parallel recording on the plurality of recording mediums is provided. This allows the RAID system to be configured on a magazine-by-magazine basis.

SUMMARY

The present disclosure provides a data erasing method for erasing data stripe-recorded in a plurality of write-once optical discs constituting a RAID system.

The data erasing method of the present disclosure is the data erasing method for erasing the data stripe-recorded in the plurality of write-once optical discs constituting the RAID system and each including a plurality of data recording blocks and a redundant data block. In the data erasing method, alternate recording of at least one target block and the redundant data block is performed in a predetermined alternate area. The target block is one of the data recording blocks in which target data as erase target data is recorded. The target block is overwritten such that the target data is not correctly read.

BRIEF DESCRIPTION OF DRAWINGS

FIG. 3 is a diagram illustrating file system management information of the first exemplary embodiment;

FIG. 8C is a diagram illustrating alternate management information when the plurality of files of the second exemplary embodiment are erased;

FIG. 8D is a diagram illustrating alternate management information when the plurality of files of the second exemplary embodiment are erased; and FIG. 9 is a diagram illustrating an outline of data erase in the optical disc RAID system.

DETAILED DESCRIPTION

Figure 1:
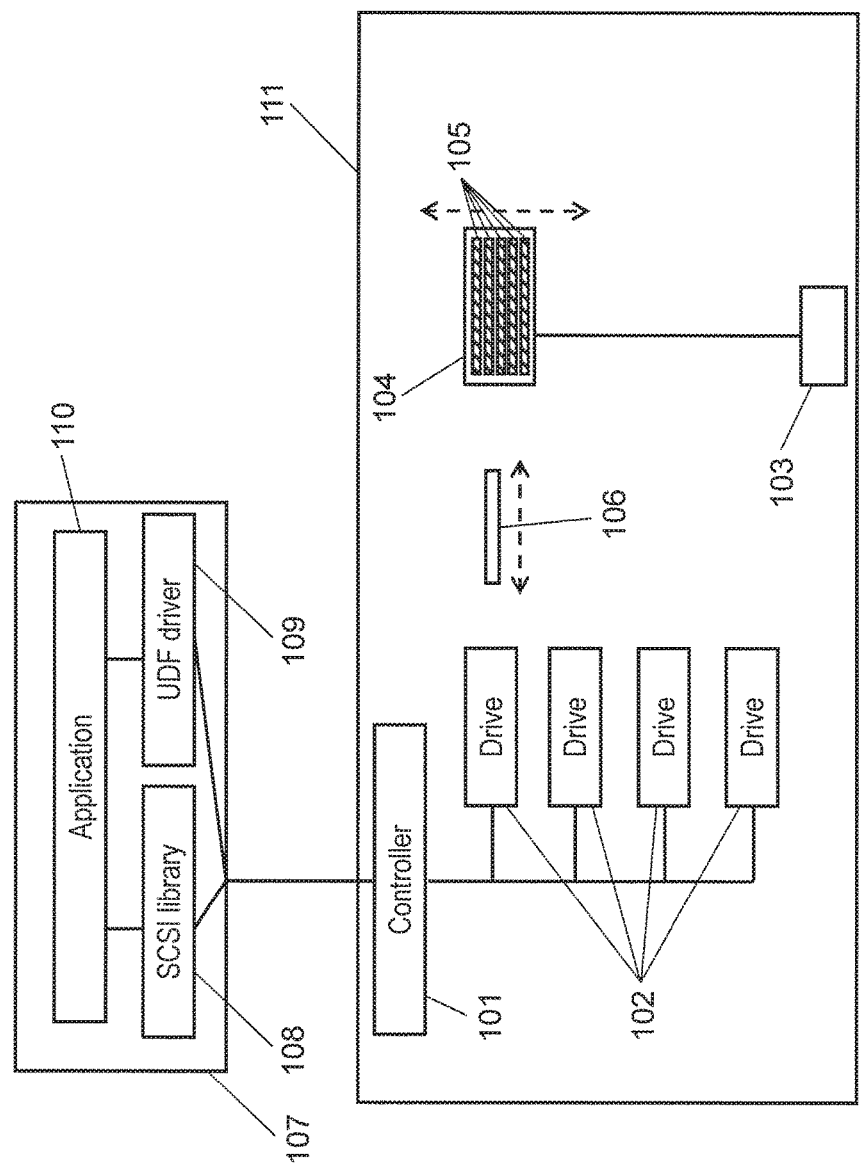
FIG. 1 is a configuration diagram illustrating a system according to a first exemplary embodiment.

Hereinafter, exemplary embodiments will be described in detail with reference to the drawings. However, the detailed description more than necessary is occasionally omitted. For example, the detailed description of an already known item or overlapping description of a substantially identical configuration is occasionally omitted. This is because unnecessary redundancy of the following description is avoided to facilitate understanding of those skilled in the art.

The inventors provide the accompanying drawings and the following description in order that those skilled in the art fully understand the present disclosure, but it is noted that the subject matter of claims is not limited to the drawings and the description.

(Background of One Aspect of the Present Disclosure)

FIG. 9 is a diagram illustrating an outline of data erase in a RAID system (hereinafter, referred to as an optical disc RAID system) in which a plurality of write-once optical discs are used. Write-once optical discs 901, 902, 903, 904 constitute a system of RAID 5. Sectors are arranged on the write-once optical disc. For example, sectors having addresses D10, D11, D12, D13 are arranged on optical disc 901. Addresses A1 to A12 are allocated to the RAID system. Addresses P1, P2, P3, P4 are sectors in each of which the parity is stored. File 1 is recorded in sector group 905, and file 2 is recorded in sector group 906.

In the case where file 1 is read from the RAID system, sector contents of addresses A1, A2, A3, A4 of the RAID system can be read. This corresponds to the case where addresses D10, D11 of optical disc 901, address D20 of optical disc 902, and address D30 of optical disc 903 are read. In the case where address A2 cannot be reproduced, the RAID system reproduces address A2 by restoring the content of address A2 from the contents of addresses A1, A3, and parity P1. That is, even if it is not possible to read from one optical disc, the RAW system ensures readable redundancy.

In the case where file 1 is erased, addresses A1 to A4, where file 1 is stored, are erased. However, even if the erase is performed on the address A4, file 1 can be restored from addresses A5, A6, and parity P2. Therefore, file 1 is not completely erased.

Also, for example, assume the case where address A5 cannot be read during the reproduction of file 2 after the erase of file 1. In this case, in an attempt to restore the content of address A5, reproduction of addresses A4, A6, and parity P2 will be tried. However, address A4 cannot be reproduced because address A4 is already erased. Thus, a read error occurs, and it is impossible to restore the content of address A5. That is, the redundancy degrades.

The present disclosure provides a method for erasing the recorded data while ensuring the redundancy of the RAID system in which the plurality of write-once optical discs are used.

First Exemplary Embodiment

FIG. 1 is a diagram illustrating a configuration of a first exemplary embodiment in a data erasing method of the optical disc RAID system. In FIG. 1, server 107 operates as application 110, small computer system interface (SCSI) library 108, and universal disk format (UDF) driver 109. More specifically, server 107 includes a CPU, a memory, and a hard disk drive (HDD). Various programs are stored in the HDD. The CPU reads various programs from the HDD onto the memory, and executes the programs, whereby the CPU operates as application 110, SCSI library 108, and UDF driver 109.

Server 107 is connected to optical disc RAID system 111. Using a SCSI command, application 110 controls optical disc RAID system 111 through SCSI library 108 or UDF driver 109.

Optical disc RAID system 111 includes controller 101, a plurality of drives 102, magazine 104, a plurality of optical discs 105, magazine carrying mechanism 103, and optical disc carrying mechanism 106. In the first exemplary embodiment, optical disc RAID system 111 includes four drives 102.

Application 110 records the file in optical disc 105 of magazine 104 in the following way. The case where files 1, 2 are recorded is described by way of example.

Application 110 issues a command to controller 101 of optical disc RAID system 111 through SCSI library 108 to load optical disc 105 of magazine 104 on drive 102. Controller 101 issues an instruction to magazine carrying mechanism 103 to carry magazine 104 to a loading position. Magazine carrying mechanism 103 carries magazine 104 to the loading position where optical disc 105 can be loaded on drive 102. Then, controller 101 issues an instruction to optical disc carrying mechanism 106 and drive 102 to load optical disc of magazine 104 on drive 102. Optical disc carrying mechanism 106 moves optical disc 105 from magazine 104 to drive 102. Drive 102 loads optical disc 105 thereon, and performs startup processing such that the recording and reproduction can be performed. Controller 101 repeats the above pieces of processing to load all optical discs 105 in magazine 104 on drives 102. The plurality of loaded optical discs 105 are regarded as one optical disc RAID. In the first exemplary embodiment, four optical discs 105 loaded on four drives 102 constitute the optical disc RAID. In the first exemplary embodiment, a RAID level is RAID 5.

Then, application 110 issues an instruction to UDF driver 109 to record files 1, 2. Pursuant to a UDF standard, UDF driver 109 searches a free sector on the optical disc RAID configured with the plurality of optical discs 105, and records the pieces of data of files 1, 2 on the optical disc RAID. At the same time, UDF driver 109 records file names and recording addresses of files 1, 2 in file system management information on the optical disc RAID. The file system management information is recorded on the optical disc RAID upon the pursuant to the UDF standard.

FIG. 3 is a diagram illustrating an example of the file system management information. It is assumed that file 1 has a size of 8 kbyte, that file 2 has a size of 10 kbyte, and that the sector has capacity of 2 kbyte in the optical disc RAID system. In this case, UDF driver 109 searches the free sector on the optical disc RAID, records file 1 in addresses A1 to A4 on the optical disc RAID, and records file 2 in addresses A5 to A9 on the optical disc RAID. At this point, the file system management information in FIG. 3 is obtained.

UDF driver 109 issues an instruction to controller 101 of optical disc RAID system 111 to record the pieces of data of files 1, 2 in addresses A1 to A4 and addresses A5 to A9 on the optical disc RAID.

Figure 2:
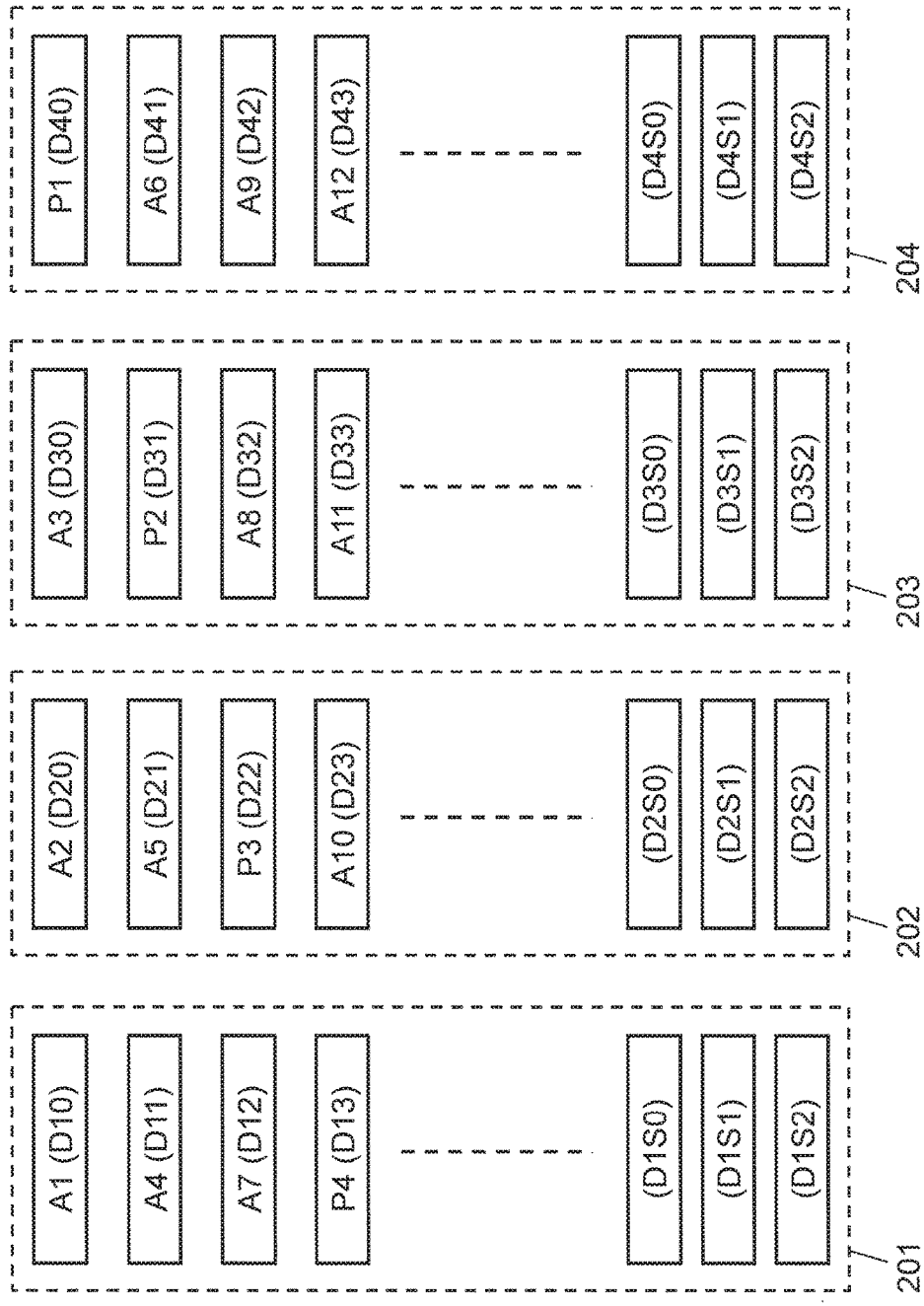
FIG. 2 is a diagram illustrating a configuration of an optical disc RAID of the first exemplary embodiment.
Figure 4A:
FIG. 4A is a diagram illustrating alternate management information of the first exemplary embodiment.
Figure 4B:
FIG. 4B is a diagram illustrating the alternate management information of the first exemplary embodiment.

The operation of controller 101 in recording files 1, file 2 in addresses A1 to A9 on the optical disc RAID will be described below with reference to FIG. 2. For convenience, optical discs 105 loaded on four drives 102 are referred to as optical discs 201, 202, 203, 204. That is, optical disc RAID system 111 constitutes the system of RAID 5 using optical discs 201, 202, 203, 204. The sectors are arranged on each optical disc. For example, the sectors having addresses D10, D11, D12, D13 are arranged on optical disc 201. Addresses A1 to A12 and addresses P1 to P4 are allocated as the RAID system to each optical disc. Addresses P1, P2, P3, P4 are sectors in each of which the parity is stored. That is, addresses P1, P2, P3, P4 are redundant data sectors. An alternate area is reserved on each optical disc. For example, alternate areas D1S0, D1S1, D1S2 are reserved on optical disc 201. The address of the optical disc RAID is not allocated to the alternate area. The alternate area is used in the case where a defect exists on the optical disc or where the erase described later is performed.

In the case where controller 101 records the data in addresses A1 to A9 on the optical disc RAID, controller 101 issues an instruction to drive 102 to record the data, which should be recorded in addresses A1, A2, A3 of the optical disc RAID, in address D10 of optical disc 201, address D20 of optical disc 202, and address D30 of optical disc 203. At the same time, controller 101 calculates the parity of RAID 5 based on the data recorded in addresses A1, A2, A3. Controller 101 issues an instruction to drive 102 to record the parity in address D40 of optical disc 204. The above operation is repeated with respect to addresses A4 to A6, A7 to A9, P2, P3 on the optical. disc RAID, thereby recording the pieces of data and parities in optical discs 201, 202, 203, 204.

Then, UDF driver 109 issues an instruction to controller 101 of optical disc RAID system 111 to record the file system management information (see FIG. 3). Controller 101 records the file system management information on the optical disc RAID.

Figure 5:
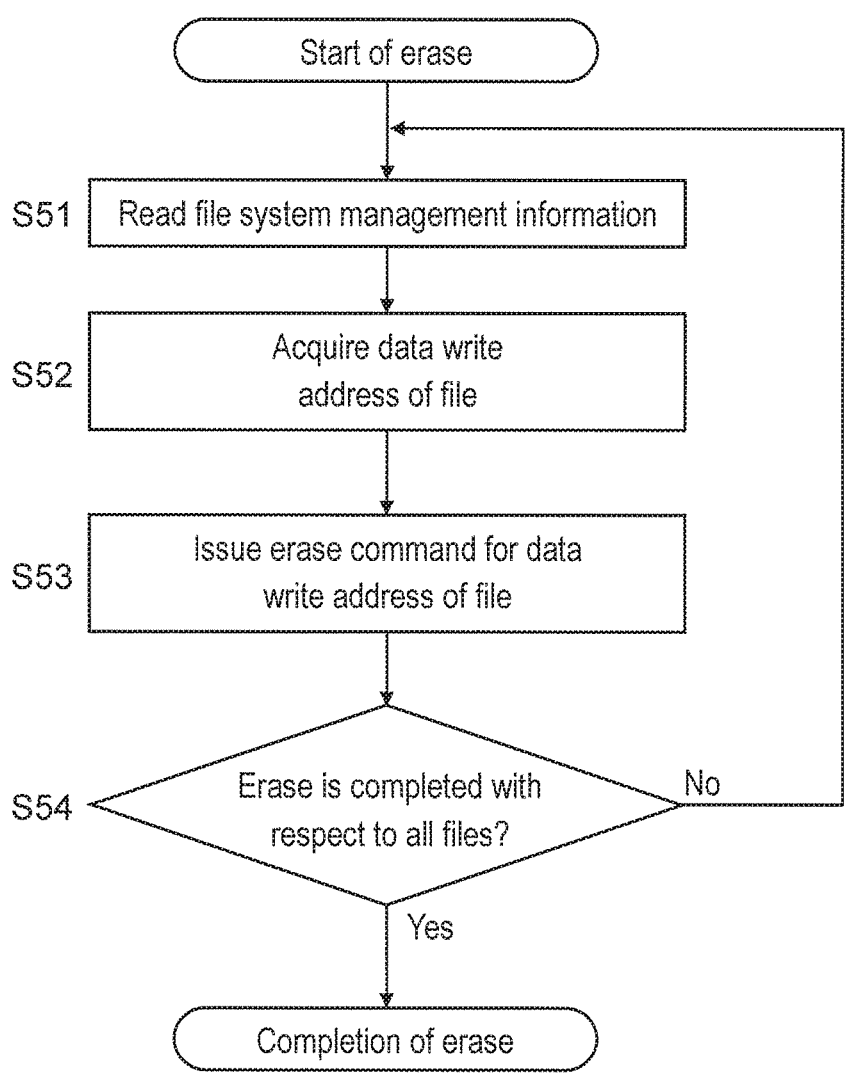
FIG. 5 is a flowchart illustrating file erasing processing of an application of the first exemplary embodiment.

A method for erasing file 1 will be described below with reference to FIGS. 4A, 4B, 5, 6. Similarly to the recording of the file, application 110 loads the optical disc 105 of magazine 104 on drive 102 in advance. FIG. 5 is a flowchart illustrating an operation in which application 110 erases the file. The case where application 110 erases file 1 is described by way of example. In step S51, application 110 issues a command to optical disc RAID system 111 through SCSI library 108 to read the file system management information about file 1. In step S52, application 110 acquires a recording address of the data of file 1 from the file system management information. In the case where the file system management information is the contents in FIG. 3, the recording address of the data of the file 1 constitutes A1 to A4. In step S53, application 110 issues an erase command to controller 101 of optical disc RAID system 111 through SCSI library 108 to erase addresses A1 to A4 in which the data of file 1 is written, thereby erasing the data of file 1. In step S54, when the erase is completed with respect to all the target files, application 110 ends the erase operation. Unless all the target files are erased, the flow returns to step S51, and application 110 erases the next file.

Figure 6:
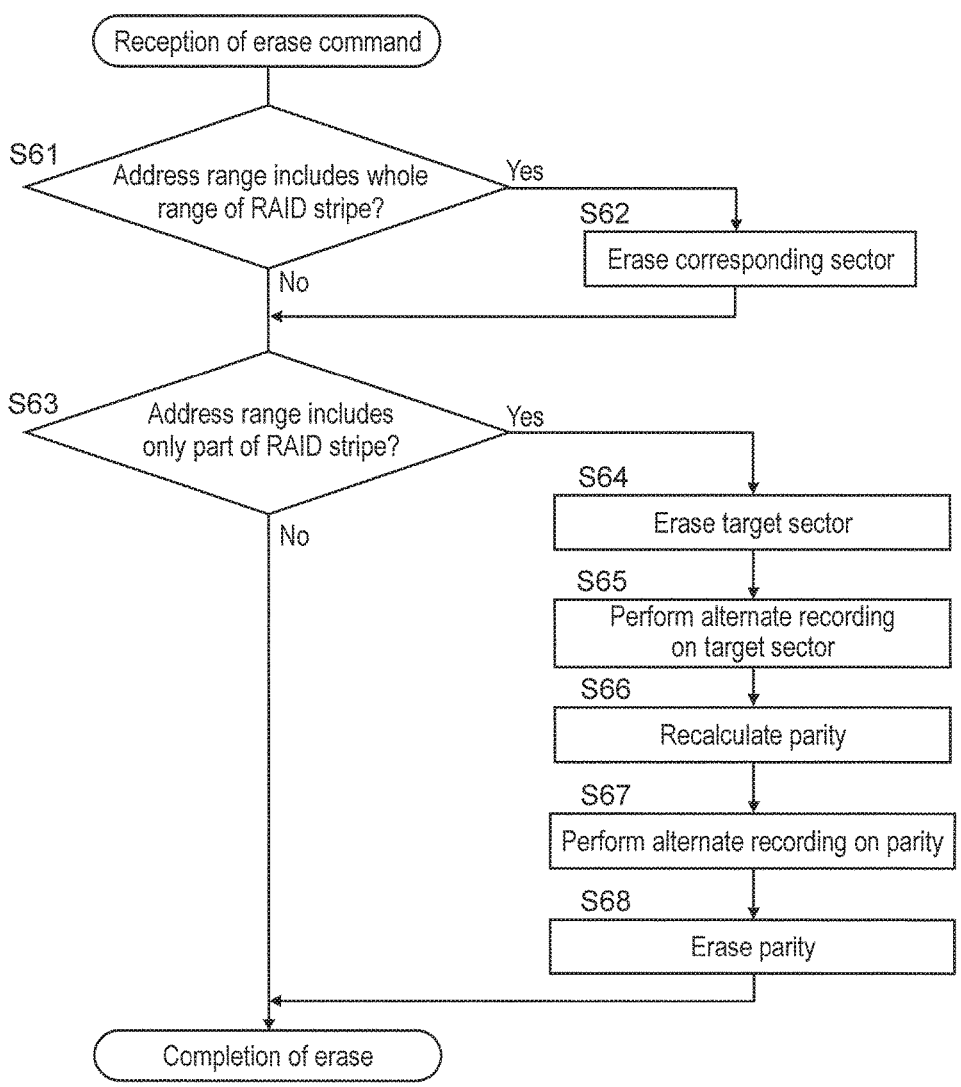
FIG. 6 is a flowchart illustrating sector erasing processing of an optical disc RAID system of the first exemplary embodiment.

FIG. 6 is a flowchart illustrating an operation in which controller 101 executes the erase command. In step S61, when receiving the erase command from application 110, controller 101 determines whether a whole range of a RAID stripe is included in the address range which is included in the erase command and the data in which should be erased. As used herein, the RAID stripe is a minimum unit in performing stripe recording on the optical disc constituting the RAID, and is a combination of the addresses necessary for the calculation of the parity. The address range of the RAID stripe is addresses A1 to A3, addresses A4 to AG, addresses A7 to A9, and addresses A10 to A12 in FIG. 2. For example, in the case where the address range specified from the application is addresses A1 to A4, controller 101 determines that the whole of addresses A1 to A3 constituting one RAID stripe is included in step S61. That is, controller 101 determines that the address range of the erase command includes the whole range of the RAID stripe (Yes in step S61). In this case, in step S62, controller 101 issues an instruction to drive 102 to erase address D10 of optical disc 201, address D20 of optical disc 202, and address D30 of optical disc 203 in order to erase addresses A1 to A3 extracted in step S61. Drive 102 erases the specified addresses. When the address range of the erase command includes the whole range of the RAID stripe, controller 101 erases all the addresses. When the erase is completed, the flow goes to step S63. In step S61, when controller 101 determines that the address range including the whole range of the RAID stripe does not exist (No in step S61), the flow goes to step S63.

In step S63, controller 101 determines whether the address range of the received erase command includes only a partial range of the RAID stripe. When determining that the address range of the erase command does not include only the partial range of the RAID stripe (No in step S63), controller 101 ends the processing. On the other hand, for example, in the case where the address range specified from the application is addresses A1 to A4, controller 101 determines that address A4 corresponds only to a part of the RAID stripe in step S63. That is, controller 101 determines that the address range of the erase command includes only the partial range of the RAID stripe (Yes in step S63). In this case, in step S64, controller 101 erases address A4 that is a part of the RAID stripe. In step S65, controller 101 performs alternate recording on address A4 using data having a content of 0. Specifically, controller 101 issues an instruction to drive 102 to erase address D11 of optical disc 201, and drive 102 erases the specified address. Controller 101 also issues an instruction to drive 102 to perform the alternate recording on address D11 of optical disc 201 using the data having the contents of all 0. Drive 102 selects free alternate area D1S0 from the alternate areas of optical disc 201, and performs the recording on alternate area D1S0 with the contents of all 0. That is, drive 102 records the data having bits of all 0 in alternate area D1S0. Drive 102 registers information indicating that address D11 of optical disc 201 is replaced with alternate destination D1S0 in the alternate management information (see FIG. 4A) about optical disc 201, and also records the alternate management information in optical disc 201. In the case where access to address D11 is made thereafter, drive 102 accesses address D1S0 instead of address D11 based on the alternate management information. In step S65, instead of the alternate recording with the contents of all 0, the alternate recording may be performed with all the contents of 1, or the alternate recording may be performed by replacing all the contents of 1 with another piece of predetermined data.

Then, controller 101 recalculates the parity of the RAID stripe including the target address in step 566. Controller 101 performs the alternate recording on the recalculated parity in step S67. In the case where address A4 of file 1 is erased in step S64, controller 101 issues an instruction to drive 102 to read addresses A4, A5, A6 of the RAID stripe including address A4. Drive 102 reads the contents of address D11 of optical disc 201, address D21 of optical disc 202, and address D41 of optical disc 204. Address D11 of optical disc 201 is replaced with address D1S0. When reading address D11, drive 102 recognizes that address D11 is replaced with address D1S0 by referring to the alternate management information in FIG. 4A. Drive 102 reads the content of address D1S0 instead of address D11. Controller 101 recalculates the parity from the read content, and issues an instruction to drive 102 to perform the alternate recording on address D31 of optical disc 203 with the recalculated parity. Drive 102 selects free alternate area D3S0 from the alternate areas of optical disc 203, and performs the recording on alternate area D3S0 with the content of the recalculated parity. Drive 102 registers information indicating that address D31 of optical disc 203 is replaced with alternate destination D3S0 in the alternate management information (see FIG. 4B) of optical disc 203, and also records the alternate management information in optical disc 203. In the case where access to address D31 is made thereafter, drive 102 accesses address D3S0 instead of address D31. Controller 101 may erase the pre-recalculation parity in step S68. Specifically, controller 101 issues an instruction to drive 102 to erase address D31 of optical disc 203, and drive 102 may erase the specified address. The operation in step S68 may be eliminated.

The data of file 1 recorded in addresses A1 to A4 of the optical disc RAID can be erased through the above erase operation. Because both the alternate recording and the recalculation and recording of the parity are performed on address A4 of the optical disc RAID, the original data of address A4 cannot be restored from addresses A5, A6, and parity P2. That is, all the pieces of data of file 1 are erased from the optical disc RAID.

In the optical disc RAID in which file 1 is erased in the above way, the redundancy identical to that of pre-erase file 1 can be ensured with respect to addresses A5, A6 where a part of file 2 is recorded, because the recalculation and the alternate recording are performed on parity P2 after the alternate recording is performed on address A4 with the contents of all 0 or another piece of predetermined data. That is, according to the method for erasing the data on the optical disc RAID of the first exemplary embodiment, the data can be erased while the redundancy is ensured with respect to the data that is not erased.

The data of parity P2 (address D31) of the alternate source in the alternate recording may be erased. In this case, controller 101 issues an instruction to drive 102 to erase address D31 of optical disc 203 in addition to the recalculation and alternate recording (steps S66, S67) of the parity, and drive 102 erases address D31 (step S68). Doing this can make it impossible to read the address D31 before the replacement and to restore the contents of A4 from the contents of addresses A5, A6, and thereby can erase file 1 more completely.

Second Exemplary Embodiment

A second exemplary embodiment of the present disclosure will be described with reference to FIGS. 7, 8A to 8D. In the second exemplary embodiment, the description of the component similar to the first exemplary embodiment is omitted.

Figure 7:
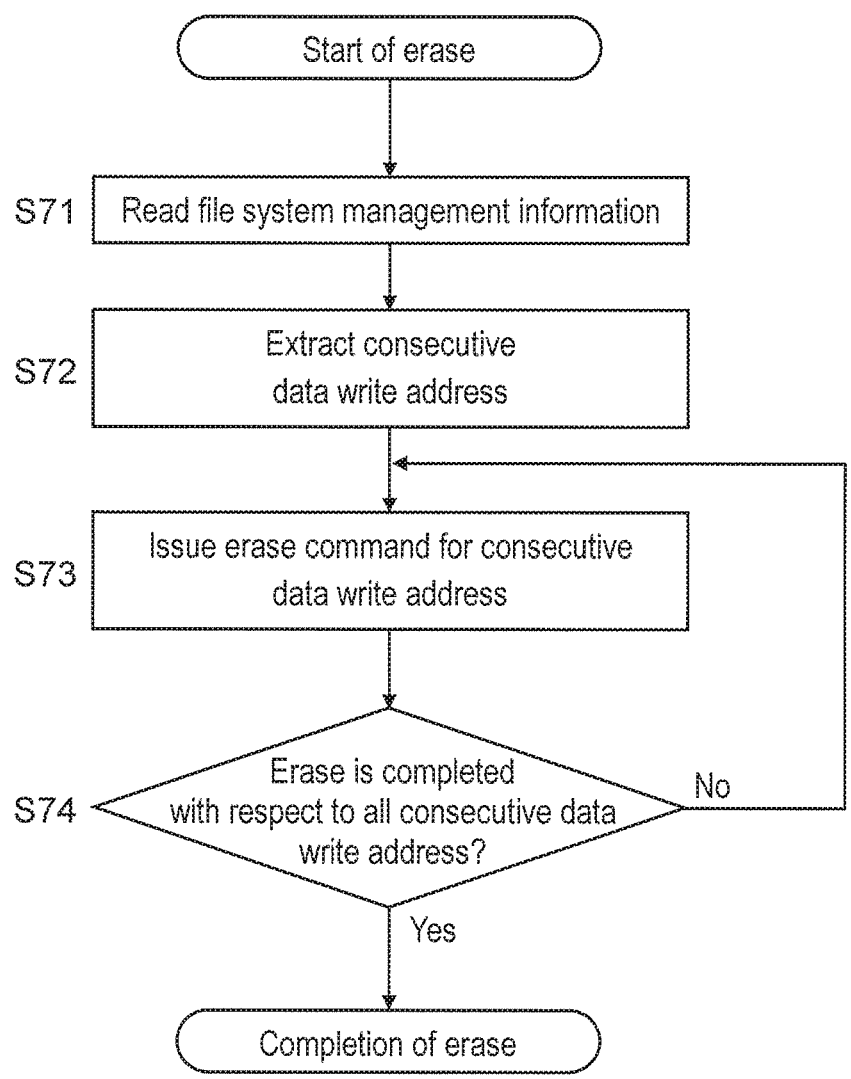
FIG. 7 is a flowchart illustrating file erasing processing of an application according to a second exemplary embodiment.
Figure 8A:
FIG. 8A is a diagram illustrating alternate management information when a plurality of files of the second exemplary embodiment are erased.
Figure 8B:
FIG. 8B is a diagram illustrating alternate management information when the plurality of files of the second exemplary embodiment are erased.

FIG. 7 is a flowchart illustrating a data erasing method, according to a second exemplary embodiment, that is an operation of application 110 that erases the plurality of files. In the second exemplary embodiment, the case where files 1, 2 recorded in the optical disc RAID are erased is described by way of example.

Similarly to the recording of the file, application 110 loads optical disc 105 of magazine 104 on drive 102 in advance.

In step S71, application 110 issues a command to optical disc RAID system 111 through SCSI library 108 to read the file system management information about files 1, 2. In step S72, application 110 acquires recording addresses of the pieces of data of files 1, 2 from the file system management information, and extracts consecutive data write addresses from the acquired recording addresses. In the case where the file system management information has the contents in FIG. 3, the recording address of the data of file 1 is A1 to A4, and the recording address of the data of file 2 is A5 to A9. Therefore, the extracted consecutive data write addresses constitute A1 to A9. In step S73, application 110 issues an erase command to controller 101 of optical disc RAID system 111 to erase extracted consecutive data write addresses A1 to A9, thereby erasing the pieces of data of files 1, 2. In step S74, when the erase is completed with respect to all the extracted consecutive data write addresses (Yes in step S74), application 110 ends the erase operation. When the erase is not completed with respect to all the extracted consecutive data write addresses (No in step S74), the flow returns to step S73, and application 110 erases the next data write addresses.

Controller 101 operates according to the flowchart in FIG. 6 in which the erase command is executed. In the case where the address specified from the application is addresses A1 to A9, controller 101 determines that addresses A1 to A9 include the whole range of the RAID stripe in step S61. Specifically, controller 101 determines that addresses A1, A2, A3, addresses A4, A5, A6, and addresses A7, A8, A9, which constitute the RAID stripe, are included in the range of addresses A1 to A9. In step S62, controller 101 erases addresses A1 to A3, A4 to A6, A7 to A9 extracted in step S61. Specifically, controller 101 issues an instruction to drive 102 to erase addresses D10, D11, D12 of optical disc 201. Controller 101 issues an instruction to drive 102 to erase addresses D20, D21 of optical disc 202. Controller 101 issues an instruction to drive 102 to erase addresses D30, D32 of optical disc 203. Controller 101 issues an instruction to drive 102 to erase addresses D41, D42 of optical disc 204. Drive 102 erases each specified address.

In step S63, controller 101 determines whether the address range of the received erase command includes only a partial range of the RAID stripe. However, in the case where the address range specified from the application is addresses A1 to A9, controller 101 determines that address range including only the part of the RAID stripe does not exist in step S63, and the erase operation is completed.

Through the above erase operation, the file can be erased while consumption of the alternate area is suppressed. In the case where files 1, 2 are erased, the alternate area is not consumed. On the other hand, in the case where files 1, 2 are erased based on the first exemplary embodiment, like pieces of alternate management information of optical discs 201 to 204 in FIG. 8A to FIG. 8D, the alternate recording occurs with respect to address A4 of the optical disc RAID, namely, address D11 of optical disc 201 and parity P2, namely, address D31 of optical disc 203 in order to erase file 1. The alternate recording occurs with respect to addresses A5, P2, A6 of the optical disc RAID, namely, address D21 of optical disc 202, address D31 of optical disc 203, and address D41 of optical disc 204 in order to erase file 2.

On the other hand, in the second exemplary embodiment, controller 101 operates so as to simultaneously erase the plurality of files. In the second exemplary embodiment, controller 101 can determine that the address range of the erase command includes the whole range of the RAID stripe configured with address A4 where the data of file 1 is recorded and addresses A5, A6 where the data of file 2 is recorded. Accordingly, the data can be erased with respect to addresses A4, A5, A6 without performing the alternate recording.

Thus, in the method for erasing the data on the optical disc RAID of the second exemplary embodiment, the consumption of the alternate area is suppressed in erasing the data, so that the data can be erased while the reliability is ensured.

Other Exemplary Embodiments

The first and second exemplary embodiments are described above as an example of the technology disclosed in the present application. The technology of the present disclosure is not limited to the first and second exemplary embodiments, but the technology can also be applied to exemplary embodiments in which changes, replacements, additions, and omissions are made. A new exemplary embodiment can be made by a combination of the components described in the first and second exemplary embodiments.

Therefore, other exemplary embodiments are illustrated below.

In the first and second exemplary embodiments, in the case where the address range of the erase command includes only the part of the RAID stripe, the alternate recording is performed by recording the contents of all 0 in the address of the alternate destination during the erase and alternate recording of the data. Alternatively, the data is not recorded in the address of the alternate destination, but an address that does not exist on the optical disc may be registered as an alternate destination address of the alternate management information. In this case, in the case where a request to reproduce the address where the address that does not exist on the optical disc is registered as the alternate destination address is made to drive 102, drive 102 returns the contents of all 0 as a reproduction result. Since this will eliminate the need to consume the alternate area, the alternate area for the erase can further be reduced. The address that does not exist on the optical disc is registered in the above description. Alternatively, an item of an alternate attribute is added to the alternate management information, the alternate recording is not performed as the alternate attribute, and an attribute indicating that the contents of all 0 are returned may be recorded in the case where access to the alternate source address is made.

In the first and second exemplary embodiments, the alternate area provided on the optical disc is used. Alternatively, in the case where the erase is performed as the optical disc RAID, the larger alternate area may be secured during formatting of the optical disc compared with an optical disc constituting the optical disc RAID in which the erase of the present disclosure is not performed (the alternate recording is performed on a defect area). This will enable securing as much alternate area for the defects as the optical disc RAID in which the erase is not performed, while securing the alternate area for the erase.

In the first and second exemplary embodiments, the alternate area provided on the optical disc is used when the defect exists on the optical disc and when the erase is performed. Alternatively, the alternate area used in existence of the defect and the alternate area used to perform the erase may separately be reserved. This can guarantee the number of times of reliably performing the erase.

In the first and second exemplary embodiments, the configuration of the optical disc RAID having the level of RAID 5 with four optical discs are used is described by way of example. Additionally, the present disclosure can also be applied to the configuration of the optical disc RAID having the level of RAID 5 or RAID 6 with five optical discs. In this case, the size of the alternate area to be reserved may be changed depending on a kind of the RAID, for example, RAID 5 or RAID 6. For RAID 6, the larger alternate area is required because of the parity increases. This can secure the number of times of performing the erase irrespective of the kind of the RAID that is used.

In the first and second exemplary embodiments, the alternate area reserved on the optical disc is used in the alternate recording. Alternatively, like pseudo over write (POW) defined by a UDF 2.6 standard, the alternate recording may be performed on a data area that is not the alternate area on the optical disc. This can eliminate the need to secure the alternate area for the erase during the formatting of the optical disc, and can enable the erase by managing a free space according to the necessity for the erase after the formatting.

In the first exemplary embodiment, in step 65, the alternate recording of the target sector is performed in the predetermined alternate area while the target data of the target sector is replaced with the predetermined data. Alternatively, in the plurality of write-once optical discs, the alternate destinations of the target sectors on the identical write-once optical disc may be identified, with each other. This can reduce the alternate area.

Because the exemplary embodiment is used to illustrate the technology of the present disclosure, various changes, replacements, additions, and omissions can be made in claims or a range equivalent to the claims.

What is claimed is:

1. A data erasing method for erasing data stripe-recorded in a plurality of write-once optical discs constituting a redundant arrays of inexpensive disks (RAID) system and each including a plurality of data recording blocks and a redundant data block, the data erasing method comprising:
performing alternate recording of at least one target block and the redundant data block in a predetermined alternate area, the target block being one of the data recording blocks in which target data as erase target data is recorded; and
overwriting the target block such that the target data is not correctly read,
wherein each of the plurality of write-once optical discs includes, in a stripe, the plurality of data recording blocks and the redundant data block corresponding to the stripe,
in the alternate recording, the alternate recording of the target block and the redundant data block is performed in the predetermined alternate area with respect to the stripe in which the target data is recorded in a part of the data recording blocks, and alternate recording is not performed with respect to the stripe in which the target data is recorded in all the data recording blocks, and
in the overwriting, the stripe in which the target data is recorded in a part of the data recording blocks is overwritten such that the target block and the redundant data block are not correctly read, and the stripe in which the target data is recorded in all the data recording blocks is overwritten such that all the data recording blocks in the stripe are not correctly read.

2. The data erasing method according to claim 1, wherein, in the overwriting, the redundant data block is overwritten such that the target data is not correctly read.

3. The data erasing method according to claim 1, wherein, in the alternate recording, the alternate recording is performed in the predetermined alternate area while redundant data of the redundant data block is replaced with recalculated redundant data.

4. The data erasing method according to claim 1, wherein, in the alternate recording, the alternate recording is performed in the alternate area used to perform the alternate recording for a defective area on the plurality of write-once optical discs.

5. The data erasing method according to claim 1, wherein, in the alternate recording, the alternate recording is performed in an alternate area that is different from both the alternate area used to perform the alternate recording for a defective area on the plurality of write-once optical discs and a user data area where user data is recorded.

6. The data erasing method according to claim 1, wherein, in the alternate recording, the alternate recording is performed in a user data area in which user data is recorded on the plurality of write-once optical discs.

7. The data erasing method according to claim 1, wherein an alternate area where the data is erased in the plurality of write-once optical discs is reserved larger than an alternate area where the data is not erased in the plurality of write-once optical discs.

8. The data erasing method according to claim 1, wherein a size of an alternate area to be reserved is changed according to an applied RAID level.

9. The data erasing method according to claim 1, wherein, in the alternate recording, alternate destinations of the target blocks on the identical write-once optical disc in the plurality of write-once optical discs are identical with each other.

10. The data erasing method according to claim 1, wherein, in the alternate recording, the alternate recording is performed in the predetermined alternate area while the target data of the target block is replaced with predetermined data.

11. The data erasing method according to claim 10, wherein the predetermined data is data having all bits of 0.

12. The data erasing method according to claim 10, wherein the predetermined data is data having all bits of 1.

* * * * *